US012641610B2

(12) United States Patent
Liu et al.

(10) Patent No.: US 12,641,610 B2
(45) Date of Patent: May 26, 2026

(54) METHODS, TERMINAL DEVICE AND NETWORK NODE FOR UPLINK TRANSMISSION

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

(21) Appl. No.: 18/330,354

(22) Filed: Jun. 6, 2023

(65) Prior Publication Data

US 2023/0319829 A1      Oct. 5, 2023

Related U.S. Application Data

(63) Continuation of application No. 17/595,305, filed as application No. PCT/CN2020/081746 on Mar. 27, 2020, now abandoned.

(30) Foreign Application Priority Data

May 13, 2019     (WO) ................ PCT/CN2019/086720

(51) Int. Cl.
$H04W 72/21$        (2023.01)
$H04L 1/1812$       (2023.01)
$H04W 72/23$        (2023.01)

(52) U.S. Cl.
CPC ........... *H04W 72/21* (2023.01); *H04L 1/1812* (2013.01); *H04W 72/23* (2023.01)

(58) Field of Classification Search
CPC ...... H04W 72/21; H04W 72/23; H04L 1/1812
See application file for complete search history.

(56) References Cited

U.S. PATENT DOCUMENTS

| | | | |
|---|---|---|---|
| 2010/0215004 A1 | 8/2010 | Yoo | |
| 2018/0110085 A1 | 4/2018 | Tseng | |
| 2018/0123765 A1 | 5/2018 | Cao et al. | |
| 2019/0223035 A1* | 7/2019 | You | H04W 72/21 |
| 2019/0229788 A1 | 7/2019 | Zhang et al. | |
| 2020/0146032 A1 | 5/2020 | Bae et al. | |
| 2020/0220693 A1 | 7/2020 | Babaei et al. | |
| 2020/0351031 A1* | 11/2020 | Wu | H04L 1/1883 |

(Continued)

FOREIGN PATENT DOCUMENTS

| | | |
|---|---|---|
| CN | 101207465 A | 6/2008 |
| WO | 2019/030726 A1 | 2/2019 |

OTHER PUBLICATIONS

3GPP TR 38.889 V16.0.0, "3rd Generation Partnership Project; Technical Specification Group Radio Access Network; Study on NR-based access to unlicensed spectrum (Release 16)," Dec. 2018, 119 pages, 3GPP Organizational Partners.

(Continued)

*Primary Examiner* — Jasper Kwoh

(74) *Attorney, Agent, or Firm* — Nicholson De Vos Webster & Elliott LLP

(57)         ABSTRACT

Methods, a terminal device and a network node for uplink transmission, in which the terminal device transmits a transport block (TB) to a network node with a first configured grant. The terminal device retransmits the TB to the network node autonomously with a second configured grant.

15 Claims, 10 Drawing Sheets

```
┌─────────────────────────────────────────┐
│  Terminal device 700                    │
│                                         │
│   ┌───────────────────────────────┐     │
│   │  Transmission module          │     │
│   │  702                          │     │
│   └───────────────────────────────┘     │
│                                         │
│                                         │
│   ┌───────────────────────────────┐     │
│   │  Retransmission module        │     │
│   │  704                          │     │
│   └───────────────────────────────┘     │
│                                         │
└─────────────────────────────────────────┘
```

(56) References Cited

U.S. PATENT DOCUMENTS

| | | |
|---|---|---|
| 2020/0351936 A1 | 11/2020 | Kunt et al. |
| 2021/0376985 A1 | 12/2021 | Zhou et al. |
| 2022/0007411 A1 | 1/2022 | Takeda et al. |
| 2022/0046710 A1* | 2/2022 | Zhang ............... H04W 74/0816 |
| 2022/0116988 A1* | 4/2022 | Shi ........................ H04L 1/1887 |
| 2022/0183049 A1* | 6/2022 | Lee ..................... H04W 72/569 |
| 2022/0183050 A1 | 6/2022 | Marco |

OTHER PUBLICATIONS

3GPP TS 38.321 V15.4.0, "3rd Generation Partnership Project; Technical Specification Group Radio Access Network; NR; Medium Access Control (MAC) protocol specification (Release 15)," Dec. 2018, 77 pages, 3GPP Organizational Partners.

3GPP TS 38.331 V15.5.1, "3rd Generation Partnership Project; Technical Specification Group Radio Access Network; NR; Radio Resource Control (RRC) protocol specification (Release 15)," Apr. 2019, 491 pages, 3GPP Organizational Partners.

Ericsson, "On Autonomous UL Transmissions for NR-U," Nov. 12-16, 2018, 4 pages, 3GPP TSG-RAN WG2 #104, TDoc R2-1817972, Spokane, WA.

Final Office Action, U.S. Appl. No. 17/595,305, Mar. 6, 2023, 15 pages.

Huawei et al., "Transmission with configured grant in NR unlicensed band", May 13-17, 2019, 22 pages, 3GPP TSG RAN WG1 Meeting #97, R1-1906047, Reno, USA.

Huawei et al., "Transmission with configured grant in NR unlicensed band", May 21-May 25, 2018, 7 pages, 3GPP TSG RAN WG1 Meeting #93, R1-1805922, Busan, Korea.

Intel Corporation, "Enhancements to configured grants for NR-unlicensed," 3GPP TSG RAN WG1 Meeting #97, R1-1906788, May 13-17, 2019, 11 pages, Reno, Nevada, USA.

International Preliminary Report on Patentability for Application No. PCT/CN2020/081746, dated Sep. 8, 2021, 27 pages.

International Search Report and Written Opinion for Application No. PCT/CN2020/081746, dated Jun. 17, 2020, 10 pages.

Non-Final Office Action, U.S. Appl. No. 17/595,305, Jul. 28, 2022, 19 pages.

Notice of Reasons for Rejection, JP App. No. 2021-567797, Feb. 28, 2023, 8 pages (4 pages of English Translation and 4 pages of Original Document).

Supplementary European Search Report and Search Opinion, EP App. No. 20805164.9, Nov. 8, 2022, 9 pages.

Decision of Rejection, JP App. No. 2023-175954, Mar. 18, 2025, 9 pages (4 pages of English Translation and 5 pages of Original Document).

Samsung, "Configured Grants in NR-U," May 13-17, 2019, 3 pages, 3GPP TSG-RAN WG2 Meeting #106, R2-1907638, Reno, USA.

Decision to Grant, EP App. No. 20805164.9, Sep. 18, 2025, 2 pages.

Communication under Rule 71(3) EPC, EP App. No. 20805164.9, Jun. 18, 2025, 5 pages.

* cited by examiner

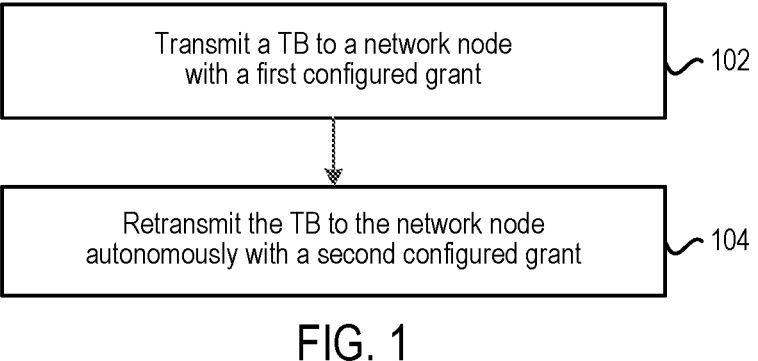

Transmit a TB to a network node
with a first configured grant ⟋ 102

Retransmit the TB to the network node
autonomously with a second configured grant ⟋ 104

FIG. 1

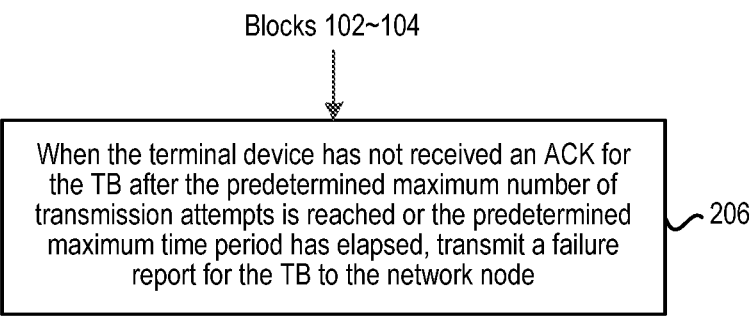

Blocks 102~104

When the terminal device has not received an ACK for
the TB after the predetermined maximum number of
transmission attempts is reached or the predetermined
maximum time period has elapsed, transmit a failure
report for the TB to the network node ⟋ 206

FIG. 2

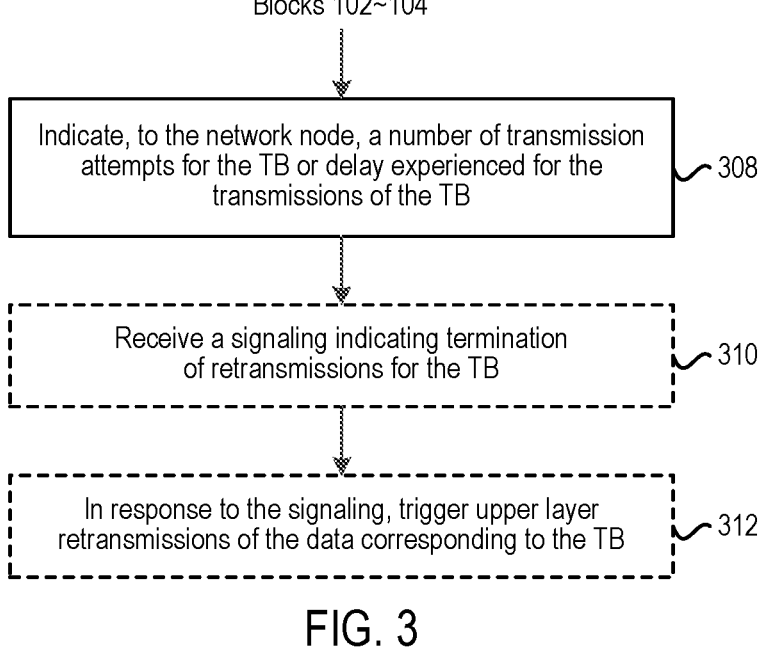

Blocks 102~104

Indicate, to the network node, a number of transmission attempts for the TB or delay experienced for the transmissions of the TB ~ 308

Receive a signaling indicating termination of retransmissions for the TB ~ 310

In response to the signaling, trigger upper layer retransmissions of the data corresponding to the TB ~ 312

FIG. 3

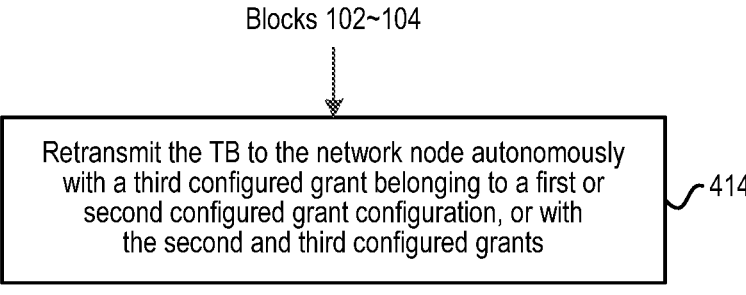

Blocks 102~104

Retransmit the TB to the network node autonomously with a third configured grant belonging to a first or second configured grant configuration, or with the second and third configured grants ~ 414

METHODS, TERMINAL DEVICE AND NETWORK NODE FOR UPLINK TRANSMISSION

CROSS-REFERENCE TO RELATED APPLICATIONS

This application is a continuation of application Ser. No. 17/595,305, filed Nov. 12, 2021, which is a National stage of International Application No. PCT/CN2020/081746, filed Mar. 27, 2020, which claims priority to International Application No. PCT/CN2019/086720, filed May 13, 2019, which are hereby incorporated by reference.

TECHNICAL FIELD

Embodiments of the disclosure generally relate to wireless communication, and, more particularly, to methods, a terminal device and a network node for uplink transmission.

BACKGROUND

This section introduces aspects that may facilitate better understanding of the present disclosure. Accordingly, the statements of this section are to be read in this light and are not to be understood as admissions about what is in the prior art or what is not in the prior art.

The 5th generation of cellular system, called new radio (NR) is developed for maximum flexibility to support multiple and substantially different use cases. Besides the typical mobile broadband use case, there are also machine type communication (MTC), ultra-low latency critical communications (ULLCC), side-link device-to-device (D2D) and several other use cases.

In NR, the basic scheduling unit is called a slot. A slot consists of 14 orthogonal frequency division multiplexing (OFDM) symbols for the normal cyclic prefix configuration. NR supports many different subcarrier spacing (SCS) configurations and at an SCS of 30 kHz the OFDM symbol duration is about 33p s. As an example, a slot with 14 symbols for the same SCS is 500 μs long (including cyclic prefixes).

NR also supports flexible bandwidth configurations for different user equipments (UEs) on the same serving cell. In other words, the bandwidth monitored by a UE and used for its control and data channels may be smaller than the carrier bandwidth. One or multiple bandwidth part (BWP) configurations for each component carrier can be semi-statically signaled to a UE, where a BWP consists of a group of contiguous physical resource blocks (PRBs). Reserved resources can be configured within the BWP. The bandwidth of a BWP equals to or is smaller than the maximal bandwidth capability supported by a UE.

NR is targeting both licensed and unlicensed bands. Allowing unlicensed networks, i.e., networks that operate in shared spectrum (or unlicensed spectrum) to effectively use the available spectrum is an attractive approach to increase system capacity. Although unlicensed spectrum does not match the qualities of the licensed regime, solutions that allow an efficient use of it as a complement to licensed deployments have the potential to bring great value to the 3rd generation partnership project (3GPP) operators, and, ultimately, to the 3GPP industry as a whole. It is expected that some features in NR will need to be adapted to comply with the special characteristics of the unlicensed band as well as also different regulations. An SCS of 15 kHz or 30 kHz are the most promising candidates for NR-based access to unlicensed spectrum (NR-U) OFDM numerologies for frequencies below 6 GHz.

When operating in unlicensed spectrum, many regions in the world require a device to sense the medium as free before transmitting. This operation is often referred to as listen before talk or LBT for short. It is designed for unlicensed spectrum co-existence with other radio access technologies (RATs). For this mechanism in NR unlicensed spectrum, a radio device applies a clear channel assessment (CCA) check (i.e. channel sensing) before any transmission. The transmitter involves energy detection (ED) over a time period compared to a certain threshold (ED threshold) in order to determine if a channel is idle. In case the channel is determined to be occupied, the transmitter performs a random back-off within a contention window before next CCA attempt. In order to protect the acknowledgement (ACK) transmissions, the transmitter must defer a period after each busy CCA slot prior to resuming back-off. As soon as the transmitter has grasped access to a channel, the transmitter is only allowed to perform transmission up to a maximum time duration (namely, the maximum channel occupancy time (MCOT)). For quality of service (QoS) differentiation, a channel access priority based on the service type has been defined. For example, there are four LBT priority classes defined for differentiation of contention window sizes (CWS) and MCOT between services.

There are many different flavors of LBT, depending on which radio technology the device uses and which type of data it wants to transmit at the moment. Common for all flavors is that the sensing is done in a particular channel (corresponding to a defined carrier frequency) and over a predefined bandwidth. For example, in the 5 GHz band, the sensing is done over 20 MHz channels.

Many devices are capable of transmitting (and receiving) over a wide bandwidth including multiple sub-bands/channels, e.g., LBT sub-band (i.e., the frequency part with bandwidth equals to LBT bandwidth). A device is only allowed to transmit on the sub-bands where the medium is sensed as free. Again, there are different flavors of how the sensing should be done when multiple sub-bands are involved.

In principle, there are two ways a device can operate over multiple sub-bands. One way is that the transmitter/receiver bandwidth is changed depending on which sub-bands that were sensed as free. In this setup, there is only one component carrier (CC) and the multiple sub-bands are treated as single channel with a larger bandwidth. The other way is that the device operates almost independent processing chains for each channel. Depending on how independent the processing chains are, this option can be referred to as either carrier aggregation (CA) or dual connectivity (DC).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for uplink transmission.

According to a first aspect of the disclosure, there is provided a method in a terminal device. The method may comprise transmitting a transport block (TB) to a network node with a first configured grant. The method may further comprise retransmitting the TB to the network node autonomously with a second configured grant.

In an embodiment of the disclosure, the autonomous retransmission of the TB may stop when a timer whose timer value equals a predetermined maximum time period expires.

In an embodiment of the disclosure, the second configured grant may belong to a first configured grant configuration. The method may further comprise retransmitting the TB to the network node autonomously with a third configured grant belonging to a second configured grant configuration.

In an embodiment of the disclosure, the second configured grant may belong to a first configured grant configuration. The method may further comprise retransmitting the TB to the network node autonomously with a third configured grant belonging to the first configured grant configuration.

In an embodiment of the disclosure, the first configured grant may belong to the first or second configured grant configuration.

In an embodiment of the disclosure, the first configured grant may belong to a third configured grant configuration.

In an embodiment of the disclosure, the TB may be transmitted with a hybrid automatic repeat request (HARQ) process.

In an embodiment of the disclosure, the autonomous retransmission of the TB may be performed one or more times with the same HARQ process.

In an embodiment of the disclosure, the timer may be started at a time point related to the transmission of the TB.

In an embodiment of the disclosure, the timer may be stopped when the terminal device receives an acknowledgement for the TB.

In an embodiment of the disclosure, a size of the TB may be determined based on the first, second or third configured grant configuration.

In an embodiment of the disclosure, the first, second or third configured grant configuration may be received from the network node.

In an embodiment of the disclosure, the TB may be retransmitted autonomously with the second configured grant when the terminal device determines that an autonomous retransmission with the second configured grant is allowed.

In an embodiment of the disclosure, the autonomous retransmission of the TB may be performed multiple times. A first part of the multiple autonomous retransmissions may be performed with the same HARQ process and a second part of the multiple autonomous retransmissions may be performed with another HARQ process.

In an embodiment of the disclosure, the another HARQ process may be used when the terminal device has not received any HARQ feedback for the TB after a predetermined number of transmission attempts or a predetermined time period.

In an embodiment of the disclosure, the second configured grant may belong to a first configured grant configuration. The method may further comprise retransmitting the TB to the network node autonomously with the second and third configured grants.

In an embodiment of the disclosure, the autonomous retransmission of the TB may stop when a predetermined maximum number of transmission attempts is reached or a predetermined maximum time period has elapsed.

In an embodiment of the disclosure, the predetermined maximum number of transmission attempts or the predetermined maximum time period may be based on a latency requirement of related service data or related one or more logical channels.

In an embodiment of the disclosure, the method may further comprise, when the terminal device has not received an acknowledgement for the TB after the predetermined maximum number of transmission attempts is reached or the predetermined maximum time period has elapsed, transmitting a failure report for the TB to the network node.

In an embodiment of the disclosure, the transmission attempts may contain one or more transmission attempts missed due to LBT failure.

In an embodiment of the disclosure, the predetermined maximum time period may contain time elapsed for one or more LBT operations.

In an embodiment of the disclosure, when the predetermined maximum number of transmission attempts is to be reached or the predetermined maximum time period is to elapse, the autonomous retransmission of the TB may be performed proactively.

In an embodiment of the disclosure, the autonomous retransmission of the TB may be performed proactively by performing the autonomous retransmission of the TB without waiting a feedback for the TB or without waiting an expiration of a configured grant retransmission timer. The expiration of the configured grant retransmission timer may be used to trigger an autonomous retransmission using a configured grant.

In an embodiment of the disclosure, the timer may be stopped when the terminal device receives a dynamic grant for retransmission of the TB.

In an embodiment of the disclosure, the timer may be started when one of following events occurs: a media access control (MAC) protocol data unit (PDU) corresponding to the TB has been generated; a first LBT operation is started for a first transmission attempt of the TB; and a first potential transmission opportunity for the TB occurs.

In an embodiment of the disclosure, a configured grant timer may be reused as the timer.

In an embodiment of the disclosure, the method may further comprise indicating, to the network node, a number of transmission attempts for the TB or delay experienced for the transmissions of the TB.

In an embodiment of the disclosure, the number of the transmission attempts or the experienced delay may be indicated by one or more of: redundant version of the TB; uplink control information (UCI); radio resource control (RRC) signaling; MAC control element (CE); and Layer 1 or Layer 2 signaling.

In an embodiment of the disclosure, the method may further comprise receiving a signaling indicating termination of retransmissions for the TB.

In an embodiment of the disclosure, the method may further comprise, in response to the signaling, triggering upper layer retransmissions of the data corresponding to the TB.

In an embodiment of the disclosure, the method may further comprise providing user data and forwarding the user data to a host computer via the transmission to the base station.

According to a second aspect of the disclosure, there is provided a method in a network node. The method may comprise receiving, from a terminal device, information related to one or more autonomous uplink retransmissions of a TB with one or more configured grants. The method may further comprise determining a scheduling policy or a scheduling decision for the TB based on the information.

In an embodiment of the disclosure, the method may further comprise transmitting one or more configured grant configurations to the terminal device.

In an embodiment of the disclosure, the scheduling policy may be determined to ensure the retransmissions from the terminal device to be completed within a predetermined maximum time period.

In an embodiment of the disclosure, the scheduling decision may indicate termination of retransmissions for the TB.

In an embodiment of the disclosure, the method may further comprise sending a signaling indicating the scheduling decision to the terminal device.

In an embodiment of the disclosure, the signaling may be sent as one or more of: a Layer 1/Layer 2 signaling; a MAC CE; and an RRC signaling.

In an embodiment of the disclosure, the information may comprise one or more of: a number of transmission attempts for the TB or delay experienced for the transmissions of the TB; a HARQ process identifier for the TB; and a failure indication that the TB is not to be retransmitted autonomously from the terminal device.

In an embodiment of the disclosure, the scheduling policy may comprise one or more of: scheduling priority for the TB; parameters for physical downlink control channel (PDCCH) carrying an uplink grant for retransmission of the TB; physical uplink shared channel (PUSCH) duration length for the TB; transmission power parameters for the TB; and PUSCH preparation delay for the TB.

In an embodiment of the disclosure, the method may further comprise transmitting, to a terminal device, information indicating a predetermined maximum number of transmission attempts or a predetermined maximum time period. The autonomous retransmission of a TB may stop when the predetermined maximum number of transmission attempts is reached or the predetermined maximum time period has elapsed.

In an embodiment of the disclosure, the predetermined maximum number of transmission attempts or the predetermined maximum time period may be based on a latency requirement of related service data or related one or more logical channels.

According to a third aspect of the disclosure, there is provided a terminal device. The terminal device may comprise at least one processor and at least one memory. The at least one memory may contain instructions executable by the at least one processor, whereby the terminal device may be operative to transmit a TB to a network node with a first configured grant. The terminal device may be further operative to retransmit the TB to the network node autonomously with a second configured grant.

In an embodiment of the disclosure, the terminal device may be operative to perform the method according to the above first aspect.

According to a fourth aspect of the disclosure, there is provided a network node. The network node may comprise at least one processor and at least one memory. The at least one memory may contain instructions executable by the at least one processor, whereby the network node may be operative to receive, from a terminal device, information related to one or more autonomous uplink retransmissions of a TB with one or more configured grants. The network node may be further operative to determine a scheduling policy or a scheduling decision for the TB based on the information.

In an embodiment of the disclosure, the network node may be operative to perform the method according to the above second aspect.

According to a fifth aspect of the disclosure, there is provided a computer program product. The computer program product may comprise instructions which when executed by at least one processor, cause the at least one processor to perform the method according to any of the above first and second aspects.

According to a sixth aspect of the disclosure, there is provided a computer readable storage medium. The computer readable storage medium may comprise instructions which when executed by at least one processor, cause the at least one processor to perform the method according to any of the above first and second aspects.

According to a seventh aspect of the disclosure, there is provided a terminal device. The terminal device may comprise a transmission module for transmitting a TB to a network node with a first configured grant. The terminal device may further comprise a retransmission module for retransmitting the TB to the network node autonomously with a second configured grant.

According to an eighth aspect of the disclosure, there is provided a network node. The network node may comprise a reception module for receiving, from a terminal device, information related to one or more autonomous uplink retransmissions of a TB with one or more configured grants. The network node may further comprise a determination module for determining a scheduling policy or a scheduling decision for the TB based on the information.

According to a ninth aspect of the disclosure, there is provided a method implemented in a communication system including a host computer, a base station and a terminal device. The method may comprise, at the host computer, receiving user data transmitted to the base station from the terminal device. The terminal device may transmit a TB to the base station with a first configured grant. The terminal device may retransmit the TB to the base station autonomously with a second configured grant.

In an embodiment of the disclosure, the method may further comprise, at the terminal device, providing the user data to the base station.

In an embodiment of the disclosure, the method may further comprise, at the terminal device, executing a client application, thereby providing the user data to be transmitted. The method may further comprise, at the host computer, executing a host application associated with the client application.

In an embodiment of the disclosure, the method may further comprise, at the terminal device, executing a client application. The method may further comprise, at the terminal device, receiving input data to the client application. The input data may be provided at the host computer by executing a host application associated with the client application. The user data to be transmitted may be provided by the client application in response to the input data.

According to a tenth aspect of the disclosure, there is provided a communication system including a host computer comprising a communication interface configured to receive user data originating from a transmission from a terminal device to a base station. The terminal device may comprise a radio interface and processing circuitry. The processing circuitry of the terminal device may be configured to transmit a TB to the base station with a first configured grant. The processing circuitry of the terminal device may be further configured to retransmit the TB to the base station autonomously with a second configured grant.

In an embodiment of the disclosure, the communication system may further include the terminal device.

In an embodiment of the disclosure, the communication system may further include the base station. The base station may comprise a radio interface configured to communicate with the terminal device and a communication interface configured to forward to the host computer the user data carried by a transmission from the terminal device to the base station.

In an embodiment of the disclosure, the processing circuitry of the host computer may be configured to execute a host application. The processing circuitry of the terminal device may be configured to execute a client application associated with the host application, thereby providing the user data.

In an embodiment of the disclosure, the processing circuitry of the host computer may be configured to execute a host application, thereby providing request data. The processing circuitry of the terminal device may be configured to execute a client application associated with the host application, thereby providing the user data in response to the request data.

According to an eleventh aspect of the disclosure, there is provided a method implemented in a communication system including a host computer, a base station and a terminal device. The method may comprise, at the host computer, receiving, from the base station, user data originating from a transmission which the base station has received from the terminal device. The base station may receive, from a terminal device, information related to one or more autonomous uplink retransmissions of a TB with one or more configured grants. The base station may determine a scheduling policy or a scheduling decision for the TB based on the information.

In an embodiment of the disclosure, the method may further comprise, at the base station, receiving the user data from the terminal device.

In an embodiment of the disclosure, the method may further comprise, at the base station, initiating a transmission of the received user data to the host computer.

According to a twelfth aspect of the disclosure, there is provided a communication system including a host computer comprising a communication interface configured to receive user data originating from a transmission from a terminal device to a base station. The base station may comprise a radio interface and processing circuitry. The base station's processing circuitry may be configured to receive, from a terminal device, information related to one or more autonomous uplink retransmissions of a TB with one or more configured grants. The base station's processing circuitry may be further configured to determine a scheduling policy or a scheduling decision for the TB based on the information.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application. The terminal device may be configured to execute a client application associated with the host application, thereby providing the user data to be received by the host computer.

According to a thirteenth aspect of the disclosure, there is provided a method implemented in a communication system including a network node and a terminal device. The method may comprise, at the terminal device, transmitting a TB to the network node with a first configured grant. The method may further comprise, at the terminal device, retransmitting the TB to the network node autonomously with a second configured grant. The method may further comprise, at the network node, receiving, from the terminal device, information related to one or more autonomous uplink retransmissions of the TB with one or more configured grants. The method may further comprise, at the network node, determine a scheduling policy or a scheduling decision for the TB based on the information.

According to a fourteenth aspect of the disclosure, there is provided a communication system comprising a terminal device and a network node. The terminal device may be configured to transmit a TB to the network node with a first configured grant, and retransmit the TB to the network node autonomously with a second configured grant. The network node may be configured to receive, from the terminal device, information related to one or more autonomous uplink retransmissions of the TB with one or more configured grants, and determine a scheduling policy or a scheduling decision for the TB based on the information.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 1 is a flowchart illustrating a method implemented at a terminal device according to an embodiment of the disclosure;

FIG. 2 is a flowchart illustrating a method implemented at a terminal device according to another embodiment of the disclosure;

FIG. 3 is a flowchart illustrating a method implemented at a terminal device according to another embodiment of the disclosure;

FIG. 4 is a flowchart illustrating a method implemented at a terminal device according to another embodiment of the disclosure;

DETAILED DESCRIPTION

Figure 5:
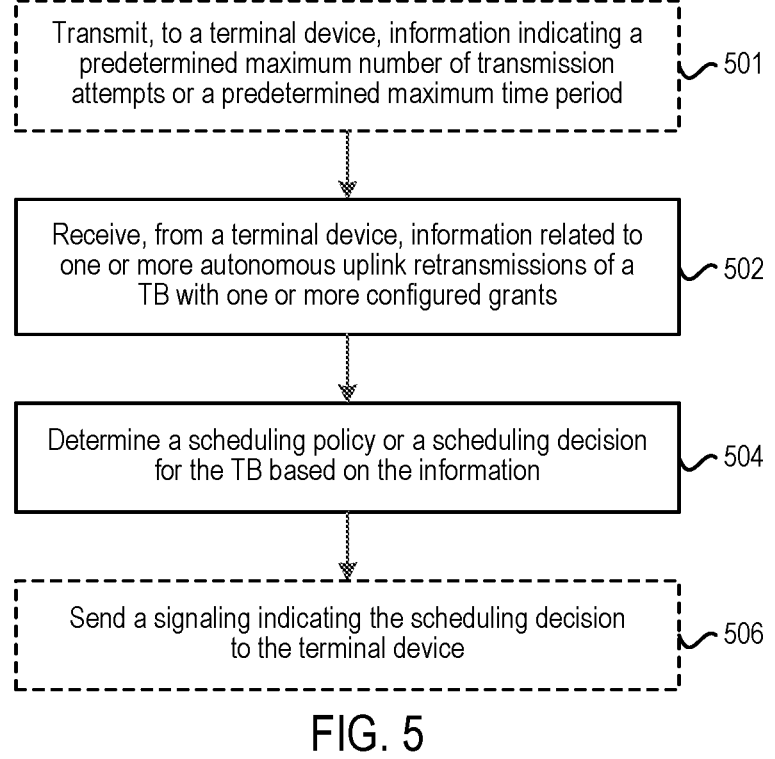
FIG. 5 is a flowchart illustrating a method implemented at a network node according to an embodiment of the disclosure.

For the purpose of explanation, details are set forth in the following description in order to provide a thorough understanding of the embodiments disclosed. It is apparent, however, to those skilled in the art that the embodiments may be implemented without these specific details or with an equivalent arrangement.

In NR-U, both configured scheduling and dynamic scheduling will be used. Configured scheduling is used to allocate semi-static periodic assignments or grants for a UE. For uplink, there are two types of configured scheduling schemes: Type 1 and Type 2. For Type 1, configured grants are configured via radio resource control (RRC) signaling only. For Type 2, similar configuration procedure as semi-persistent scheduling (SPS) uplink (UL) in long term evolution (LTE) was defined, i.e. some parameters are preconfigured via RRC signaling and some physical layer parameters are configured via media access control (MAC) scheduling procedure. The detailed procedures can be found in 3GPP technical specification (TS) 38.321 V15.4.0. The configured uplink scheduling will be also used in NR unlicensed operation. For NR-U, the configured scheduling can improve the channel access probability for physical uplink shared channel (PUSCH) transmission because additional LBT for physical downlink control channel (PDCCH) transmission per UL grant is avoided and the UE can acquire channel for PUSCH transmission using a configured grant after LBT success. In this uplink transmission procedure, only single LBT procedure is needed compared to 3 LBT procedures (one for scheduling request (SR) transmission (TX), one for PDCCH for UL grant and one for PUSCH TX) relying on SR/buffer status report (BSR) procedure. This can significantly improve the channel access probability for PUSCH transmission.

As captured in the 3GPP technical report (TR) 38.889 V16.0.0, allowing consecutive configured grant resources in time without any gaps in between the resources and non-consecutive configured grant resources (not necessarily periodic) with gaps in between the resources is beneficial and should be considered for NR in unlicensed spectrum.

For NR-U, certain enhancements of configured scheduling are needed. For instance, when the initial transmission using a configured grant is determined to be failed by a UE, the UE can perform automatic retransmission using another configured grant. Such enhancement configured scheduling scheme is referred to as autonomous uplink (AUL) transmission.

To support autonomous retransmission in uplink using a configured grant, a new timer was introduced to protect the HARQ procedure so that the retransmission can use the same HARQ process for retransmission as for the initial transmission. The new timer ("CG retransmission timer") is introduced for auto retransmission (i.e. timer expiry=HARQ NACK) on configured grant for the case of the TB previously being transmitted on a configured grant. The new timer is started when the TB is actually transmitted on the configured grant and stopped upon reception of HARQ feedback (e.g. dynamic feedback indicator (DFI)) or dynamic grant for the HARQ process. The legacy configured grant timer and behavior is kept for preventing the configured grant overriding the TB scheduled by dynamic grant, i.e. it is (re)started upon reception of the PDCCH as well as transmission on the PUSCH of dynamic grant.

With these agreements, a CG retransmission timer is started for a HARQ process configured with autonomous uplink (AUL) transmission upon the data transmission using a configured grant, and autonomous retransmission using another configured grant is triggered when the CG retransmission timer expires.

However, AUL is designed on top of the existing configured grant framework in NR Release 15, where the HARQ retransmission is fully controlled or scheduled by a next generation node B (gNB). In other words, the gNB determines when to complete transmission for a HARQ process via providing a new grant to the HARQ process. AUL has introduced a new function to support autonomous HARQ retransmission upon expiry of the CG retransmission timer. In this situation, there may be several issues below.

First, the gNB may not know how many transmission attempts that the UE has performed so that the HARQ acknowledgement/non-acknowledgement (A/N) in the DFI may be not replied by the gNB in time, so that additional latency for HARQ transmission may be caused.

Second, the UE may just continuously initiate autonomous HARQ retransmissions for a HARQ process for a very long time. However, the gNB may not successfully receive the TB either due to bad radio channel quality or because the channel is seldom obtained due to LBT failures.

As a result, a huge delay may be incurred for a HARQ process configured with AUL. This may further block the transmission window at upper layers such as radio link control (RLC) layer, packet data convergence protocol (PDCP) layer or transmission control protocol (TCP) layer.

The present disclosure proposes an improved solution for uplink transmission. The solution may be applied to a wireless communication system including a terminal device and a network node such as a base station or any other node with similar functionality. The terminal device can communicate through a radio access communication link with the base station. The base station can provide radio access communication links to terminal devices that are within its communication service cell. Note that the communications may be performed between the terminal device and the base station according to any suitable communication standards and protocols. The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Now, several embodiments will be described to explain the improved solution for uplink transmission. Although these embodiments will be described in the context of NR-U, the principle of the disclosure is also applicable to other unlicensed operation scenarios (e.g. LTE LAA/eLAA/feLAA/MuLteFire) and licensed operation scenarios where autonomous uplink retransmission using configured grant may be adopted. The term LAA refers to licensed assisted access, the term eLAA refers to enhanced LAA and the term feLAA refers to further enhanced LAA.

As a first embodiment, for a HARQ process configured with AUL using a configured grant, a maximum time period may be configured during which a UE is allowed to perform autonomous retransmissions. In other words, the UE stops to retransmit a TB for the corresponding HARQ process when the configured maximum time period has elapsed. In this way, the autonomous retransmission is only allowed within the delay budget. For example, the maximum time period may be configured according to the latency requirement of the associated service data or logical channels (LCHs).

For example, a corresponding timer may be defined for this purpose. The timer may be started when for example any of below events occurs: a first event that the MAC PDU has been built and the MAC PDU is delivered to the HARQ process; a second event that the first LBT operation is started for the first transmission attempt of the TB; and a third event that the first OFDM symbol of the first potential transmission opportunity for the TB appears.

The timer may be stopped when the UE has received a HARQ ACK for the corresponding HARQ process. Upon expiration of the timer without receiving HARQ ACK, a HARQ failure for the HARQ process may be triggered and reported to upper layers above the MAC layer. Optionally, the report message may also comprise other information, such as the number of transmission attempts that the UE has tried, HARQ process identifier (ID), etc. Upon this, the UE MAC may inform the upper layer (such as RLC) to trigger retransmission for corresponding PDUs. Optionally, the UE may also send a HARQ failure report to the gNB via signaling means such as RRC, MAC CE or Layer 1/Layer 2 (L1/L2) control signaling.

In this embodiment, the time length may contain the time for the LBT operations (such as the time when LBT failures occur). The timer may be a newly defined timer, or an existing timer (such as configuredGrantTimer) may be reused as the timer. In case configuredGrantTimer is reused for controlling maximum AUL retransmissions attempts, upon expiration of the configuredGrantTimer, the UE may further check additional information to know the reason why the timer is expired. For example, if the timer was not started/restarted due to a transmission with a configured grant for this HARQ process, the UE assumes HARQ ACK for the associated HARQ process upon the expiration of the timer. Otherwise, the UE assumes HARQ failure for the associated HARQ process upon the expiration of the timer. For example, the term "start" may mean the timer is started for the first time or started after the timer expires. The term "restart" may mean the timer is started again before the timer expires.

In case configuredGrantTimer is not reused, the UE may be configured not to start the configuredGrantTimer upon a new transmission for the associated HARQ process with a configured grant. Instead, the new timer is started.

As a second embodiment, for a HARQ process configured with AUL using a configured grant, a maximum number of HARQ transmission attempts may be configured. Similar to the first embodiment, the maximum number of HARQ transmission attempts may be configured according to the latency requirement of the associated service data or LCHs. When the maximum HARQ transmission attempts are reached, while the UE has not received HARQ ACK, a HARQ failure for the HARQ process may be triggered and reported to upper layers above the MAC layer. Optionally, the report message may comprise other information, such as the number of transmission attempts that the UE has tried, HARQ process ID, etc. Upon this, the UE MAC may inform the upper layer (such as RLC) to trigger retransmission for corresponding PDUs. Optionally, the UE may send a HARQ failure report to the gNB via signaling means such as RRC, MAC CE or L1/L2 control signaling. In this embodiment, the missed transmission attempts due to LBT failures may be considered.

As a third embodiment, a UE may indicate the number of transmission attempts or the experienced delay for a TB explicitly or implicitly. As an example, the information may be included in the uplink control information (UCI) associated with the PUSCH transmission using a configured grant. The UCI may be carried on PUCCH, or on PUSCH (may be multiplexed with the data same as PUCCH-UCI transmitted on PUSCH). As another example, the information may be included in an RRC signaling, an MAC CE or an L1/L2 signaling. As yet another example, the number of transmission attempts may be implicitly indicated via redundant version (RVI) of the TB, which may be included in the UCI.

Upon reception of the information via such as UCI, the gNB may determine the experienced delay for the corresponding TB. Thereafter, the gNB may determine a proper scheduling policy for the corresponding TB (such as scheduling priority, parameters for PDCCH to convey UL grant for the retransmission, PUSCH duration length (e.g. subcarrier spacing, number of OFDM symbols), transmit power parameters, and PUSCH preparation delay, etc.).

As an exemplary example, in order to meet a given delay threshold for the TB, the gNB may take at least one of below actions to ensure the UE to finish transmissions of the associated HARQ process within a maximum time period, which may be configured by the gNB:

1) give higher scheduling priority for the TB;
2) transmit DCI using a more reliable PDCCH format (e.g. high aggregation level) for UL grant transmission;
3) schedule resource for the TB with high PUSCH transmission power and short PUSCH preparation (such as K2)/transmission duration.

In this way, the autonomous uplink HARQ retransmission performance can be enhanced and meanwhile the latency requirement can be ensured.

Alternatively, upon reception of the information from the UE, the gNB may decide to terminate the transmissions of the associated HARQ process, for example, if the gNB thinks that the UE has used too many resources. The gNB may then reschedule the resources to other data. The termination of transmissions may be signaled via any of signaling means including, but not limited to, a L1/L2 signaling such as DCI indication; a MAC CE; and an RRC signaling. Upon reception of the termination signaling for a HARQ process, the UE MAC may inform the upper layer of this and may further trigger upper layer retransmissions.

As a fourth embodiment, for a pending TB associated with a HARQ process, after a predetermined number of transmission attempts or a configured time period while the UE has not received any HARQ A/N for the TB from the gNB, the UE may transmit the TB using another HARQ process. In this case, the timer for the maximum time period associated with the new HARQ process may be started, while the old timer may be stopped.

The UE may also use a dynamic grant to retransmit the TB with the same or a different HARQ process and the timer may be also restarted. The pending TB may be treated as a separate new transmission by the UE for subsequent transmission attempts.

As a fifth embodiment, when the timer is going to expire or the maximum number of transmission attempts is going to be reached, the UE may perform proactive retransmissions for the corresponding TB without waiting for DFI feedback or the expiration of the CG retransmission timer. In this way, the data transmission reliability can be improved when the latency budget is to be exhausted.

As a sixth embodiment, the timer may be stopped when the UE has received a dynamic grant for retransmissions of the TB for the corresponding HARQ process. In this case, the gNB takes over scheduling for this HARQ process.

As a seventh embodiment, the UE MAC may use transmission opportunities/occasions provided by a different configured grant configuration to transmit a pending TB which has been built according to a configured grant belonging to another configured grant configuration. In this way, more transmission opportunities/occasions are achievable for the pending TB. The related description of the configured grant configuration can be found from clause 6.3.2 (Config-uredGrantConfig Information element) of 3GPP TS 38.331 (RRC protocol) V15.5.1. As defined in this technical specification, the configured grant configuration can be signaled by the network to a terminal device.

Hereinafter, the solution will be further described with reference to FIGS. 1-14. FIG. 1 is a flowchart illustrating a method implemented at a terminal device according to an embodiment of the disclosure. At block 102, the terminal device transmits a TB to a network node with a first configured grant. The network node may be a base station or any other node with similar functionality. The TB may be transmitted with a HARQ process. At block 104, the terminal device retransmits the TB to the network node autonomously with a second configured grant. The TB may be retransmitted autonomously with the second configured grant when the terminal device determines that an autonomous retransmission with the second configured grant is allowed.

To restrict the delay caused by the autonomous uplink retransmissions, there may be five options. As the first option, the autonomous retransmission of the TB stops when a predetermined maximum time period has elapsed. The predetermined maximum time period may be based on a latency requirement of related service data or related one or more logical channels. Optionally, the predetermined maximum time period may contain time elapsed for one or more LBT operations.

For example, a timer whose timer value equals the predetermined maximum time period may be used such that the autonomous retransmission of the TB stops when the timer expires. The timer may be started at a time point related to the transmission of the TB. As an exemplary example, the timer may be started when one of following events occurs: a first event that a MAC PDU corresponding to the TB has been generated; a second event that the first LBT operation is started for the first transmission attempt of the TB; and a third event that the first potential transmission opportunity for the TB occurs. The timer may be stopped when the terminal device receives an acknowledgement for the TB or a dynamic grant for retransmission of the TB. The timer may be a newly introduced timer. Alternatively, a configured grant timer may be reused as the timer.

As the second option, the autonomous retransmission of the TB stops when a predetermined maximum number of transmission attempts is reached. For example, the predetermined maximum number of transmission attempts may be based on a latency requirement of related service data or related one or more logical channels. The transmission attempts may contain the initial transmission and subsequent retransmissions. Additionally, the transmission attempts may further contain the missed attempts (for the initial transmission and subsequent retransmissions) due to LBT failures.

In the above first and second options, when the terminal device has not received an acknowledgement for the TB after the predetermined maximum time period has elapsed or the predetermined maximum number of transmission attempts is reached, the terminal device may optionally transmit a failure report for the TB to the network node at block 206 as shown in FIG. 2. Alternatively, the terminal device may trigger upper layer retransmissions of the data corresponding to the TB. The upper layer refers to the layer above MAC layer.

Optionally, when the predetermined maximum time period is to elapse or the predetermined maximum number of transmission attempts is to be reached, the autonomous retransmission of the TB may be performed proactively. For example, the autonomous retransmission of the TB may be performed without waiting a feedback for the TB or without waiting an expiration of a configured grant retransmission timer. The expiration of the configured grant retransmission timer may be used to trigger an autonomous retransmission using a configured grant.

As the third option, the terminal device indicates, to the network node, a number of transmission attempts for the TB or delay experienced for the transmissions of the TB at block 308 as shown in FIG. 3. For example, the number of the transmission attempts or the experienced delay may be indicated by one or more of: redundant version of the TB; UCI; RRC signaling; MAC CE; and L1/L2 signaling. In this way, the network node may use the indicated information to improve the retransmissions from the terminal device, such that the retransmissions can be completed within a predetermined maximum time period. Alternatively, the network node may make a scheduling decision to terminate the retransmissions for the TB. Correspondingly, the terminal device may receive a signaling indicating termination of retransmissions for the TB at block 310. In response to the signaling, the terminal device may trigger upper layer retransmissions of the data corresponding to the TB at block 312.

As the fourth option, the autonomous retransmission of the TB is performed multiple times. A first part of the multiple autonomous retransmissions is performed with the same HARQ process and a second part of the multiple autonomous retransmissions is performed with another HARQ process. The first part or second part may be one or more of the multiple autonomous retransmissions. For example, the another HARQ process may be used when the terminal device has not received any HARQ feedback for the TB after a predetermined number of transmission attempts or a predetermined time period. The fourth option may be used in combination with any of the above first to third options. Alternatively, in any of the above first to third options, the autonomous retransmission of the TB may be performed one or more times with the same HARQ process.

As described above, the UE MAC may use transmission opportunities/occasions provided by a different configured grant configuration to transmit a pending TB which has been built according to a configured grant belonging to another configured grant configuration. Thus, as the fifth option, the second configured grant belongs to a first configured grant configuration. The terminal device retransmits the TB to the network node autonomously with a third configured grant belonging to the first configured grant configuration or a second configured grant configuration, or with the second and third configured grants, at block 414 as shown in FIG. 4. In this case, it is possible that the first configured grant belongs to the first or second configured grant configuration. It is also possible that the first configured grant belongs to a third configured grant configuration. Accordingly, the size of the TB may be determined based on the first, second or third configured grant configuration. Note that the first, second or third configured grant configuration may be received from the network node, as mentioned above. Also note that any one of the above first to fifth options may be used alone or in combination.

FIG. 5 is a flowchart illustrating a method implemented at a network node according to an embodiment of the disclosure. The network node may be a base station or any other node with similar functionality. At block 502, the base station receives, from a terminal device, information related to one or more autonomous uplink retransmissions of a TB with one or more configured grants. For example, the information may comprise one or more of: the number of transmission attempts for the TB or delay experienced for the transmissions of the TB; a HARQ process identifier for the TB; and a failure indication that the TB is not to be retransmitted autonomously from the terminal device.

At block 504, the network node determines a scheduling policy or a scheduling decision for the TB based on the information. The scheduling policy may be determined to ensure the retransmissions from the terminal device to be completed within a predetermined maximum time period. For example, the scheduling policy may comprise one or more of: scheduling priority for the TB (e.g. a higher scheduling priority may be determined); parameters for PDCCH carrying an uplink grant for retransmission of the TB (e.g. a more reliable PDCCH format may be determined); PUSCH duration length for the TB (e.g. a short PUSCH duration length may be determined); transmission power parameters for the TB (e.g. a high transmission power may be determined); and PUSCH preparation delay for the TB (e.g. a short PUSCH preparation delay may be determined).

The scheduling decision may indicate termination of retransmissions for the TB. For example, if the terminal device has used too many resources, the network node may make this scheduling decision. A signaling indicating the scheduling decision may be sent to the terminal device at block 506. The signaling may be sent as one or more of: a L1/L2 signaling; a MAC CE; and an RRC signaling.

Blocks 502~506 correspond to the third option described above. Alternatively or additionally, the network node may transmit, to a terminal device, information indicating a predetermined maximum number of transmission attempts or a predetermined maximum time period at block 501, which corresponds to the above first and second options. The autonomous retransmission of a TB stops when the predetermined maximum number of transmission attempts is reached or the predetermined maximum time period has elapsed. In addition, as mentioned above, the configured grant configuration can be signaled by the network to a terminal device. Thus, the above method implemented at the network node may further comprise transmitting one or more configured grant configurations to the terminal device. It should be also noted that two blocks shown in succession in the figures may, in fact, be executed substantially concurrently, or the blocks may sometimes be executed in the reverse order, depending upon the functionality involved.

Based on the above description, at least one aspect of the disclosure provides a method implemented in a communication system including a network node and a terminal device. The method may comprise, at the terminal device, transmitting a TB to the network node with a first configured grant. The method may further comprise, at the terminal device, retransmitting the TB to the network node autonomously with a second configured grant. The method may further comprise, at the network node, receiving, from the terminal device, information related to one or more autonomous uplink retransmissions of the TB with one or more configured grants. The method may further comprise, at the network node, determining a scheduling policy or a scheduling decision for the TB based on the information.

Figure 6:
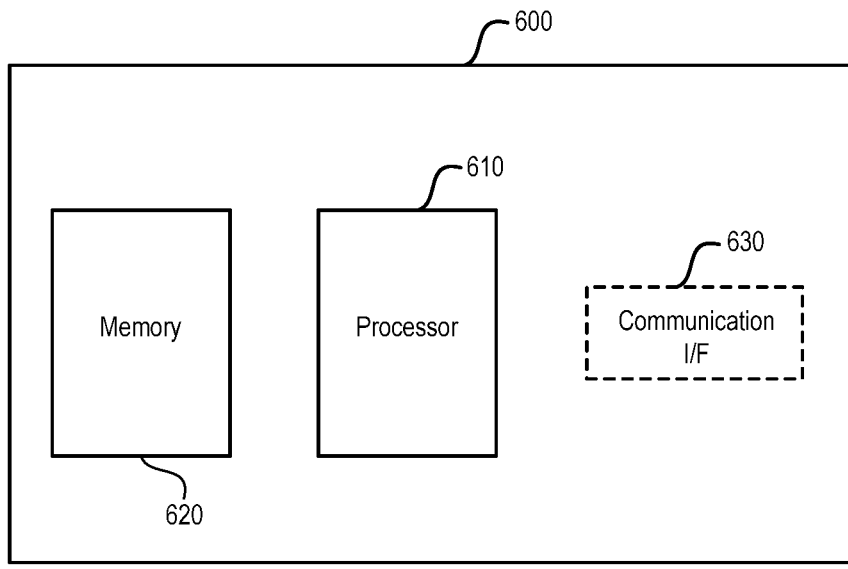
FIG. 6 is a block diagram showing an apparatus suitable for use in practicing some embodiments of the disclosure.

FIG. 6 is a block diagram showing an apparatus suitable for use in practicing some embodiments of the disclosure. For example, any one of the terminal device and the network node described above may be implemented through the apparatus 600. As shown, the apparatus 600 may include a processor 610, a memory 620 that stores a program, and optionally a communication interface 630 for communicating data with other external devices through wired and/or wireless communication.

The program includes program instructions that, when executed by the processor 610, enable the apparatus 600 to operate in accordance with the embodiments of the present disclosure, as discussed above. That is, the embodiments of the present disclosure may be implemented at least in part by computer software executable by the processor 610, or by hardware, or by a combination of software and hardware.

The memory 620 may be of any type suitable to the local technical environment and may be implemented using any suitable data storage technology, such as semiconductor based memory devices, flash memories, magnetic memory devices and systems, optical memory devices and systems, fixed memories and removable memories. The processor 610 may be of any type suitable to the local technical environment, and may include one or more of general purpose computers, special purpose computers, microprocessors, digital signal processors (DSPs) and processors based on multi-core processor architectures, as non-limiting examples.

Figure 7:
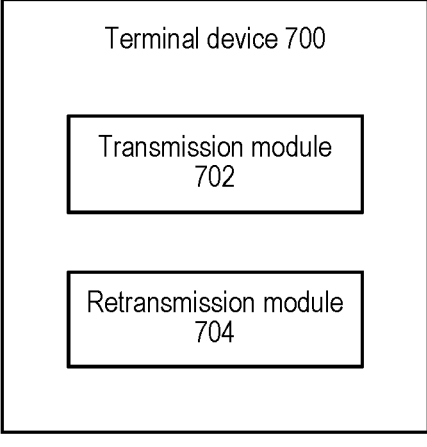
FIG. 7 is a block diagram showing a terminal device according to an embodiment of the disclosure.

FIG. 7 is a block diagram showing a terminal device according to an embodiment of the disclosure. As shown, the terminal device 700 comprises a transmission module 702 and a retransmission module 704. The transmission module 702 may be configured to transmit a TB to a network node with a first configured grant, as described above with respect to block 102. The retransmission module 704 may be configured to retransmit the TB to the network node autonomously with a second configured grant, as described above with respect to block 104.

Figure 8:
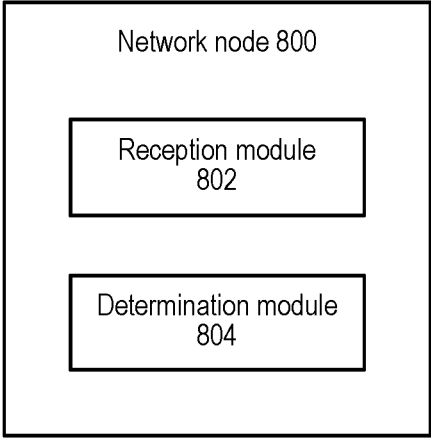
FIG. 8 is a block diagram showing a network node according to an embodiment of the disclosure.

FIG. 8 is a block diagram showing a network node according to an embodiment of the disclosure. As shown, the network node 800 comprises a reception module 802 and a determination module 804. The reception module 802 may be configured to receive, from a terminal device, information related to one or more autonomous uplink retransmissions of a TB with one or more configured grants, as described above with respect to block 502. The determination module 804 may be configured to determining a scheduling policy or a scheduling decision for the TB based on the information, as described above with respect to block 504. The modules described above may be implemented by hardware, or software, or a combination of both.

Based on the above description, at least one aspect of the disclosure provides a communication system comprising a terminal device and a network node. The terminal device may be configured to transmit a TB to the network node with a first configured grant, and retransmit the TB to the network node autonomously with a second configured grant. The network node may be configured to receive, from the terminal device, information related to one or more autonomous uplink retransmissions of the TB with one or more configured grants, and determine a scheduling policy or a scheduling decision for the TB based on the information.

Figure 9:
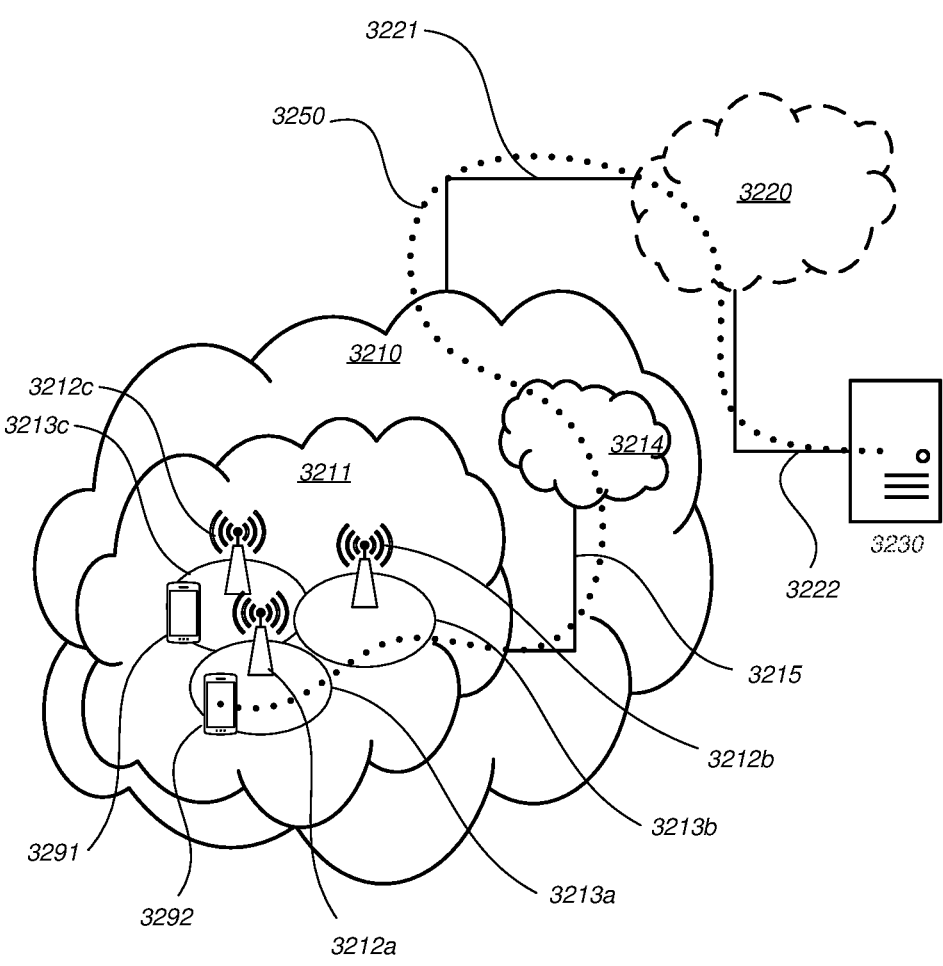
FIG. 9 is a diagram showing a telecommunication network connected via an intermediate network to a host computer in accordance with some embodiments.

With reference to FIG. 9, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 9 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 10) served by base station 3320. Communication interface 3326 may be configured to facilitate connection 3360 to host computer 3310. Connection 3360 may be direct or it may pass through a core network (not shown in FIG. 10) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 10:
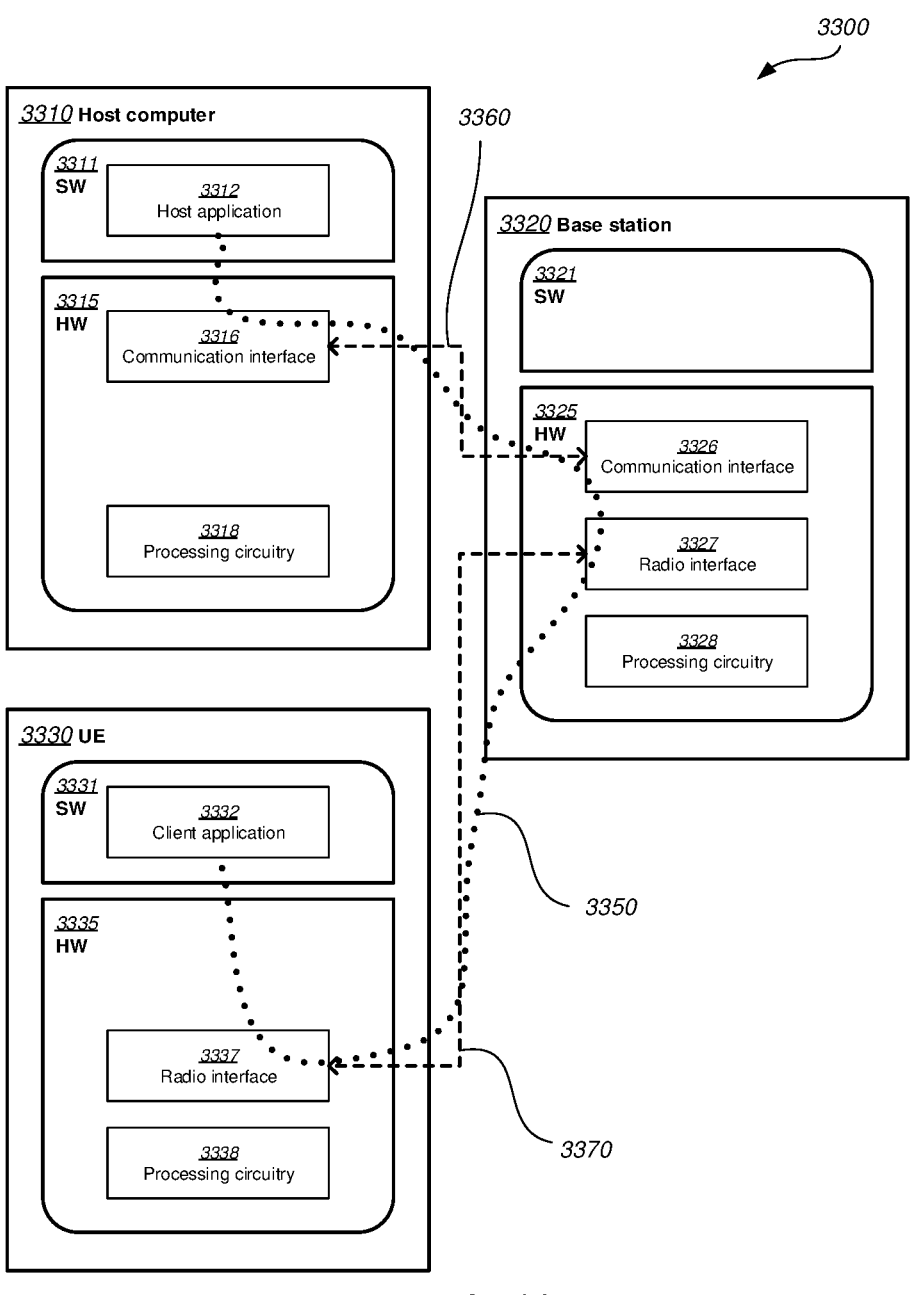
FIG. 10 is a diagram showing a host computer communicating via a base station with a user equipment in accordance with some embodiments.

It is noted that host computer 3310, base station 3320 and UE 3330 illustrated in FIG. 10 may be similar or identical to host computer 3230, one of base stations 3212a, 3212b, 3212c and one of UEs 3291, 3292 of FIG. 9, respectively. This is to say, the inner workings of these entities may be as shown in FIG. 10 and independently, the surrounding network topology may be that of FIG. 9.

In FIG. 10, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 11:
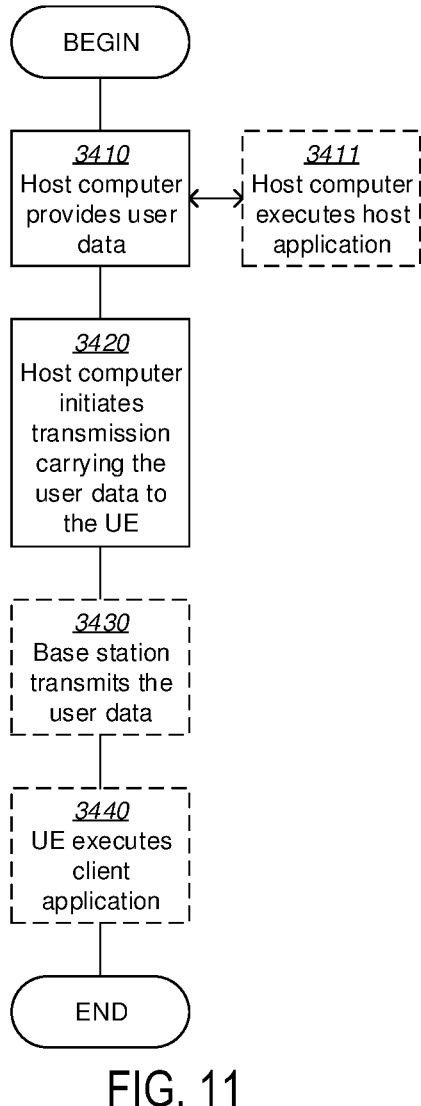
FIG. 11 is a flowchart illustrating a method implemented in a communication system in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 12:
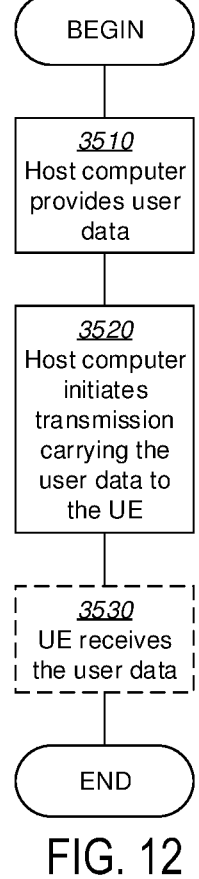
FIG. 12 is a flowchart illustrating a method implemented in a communication system in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 13:
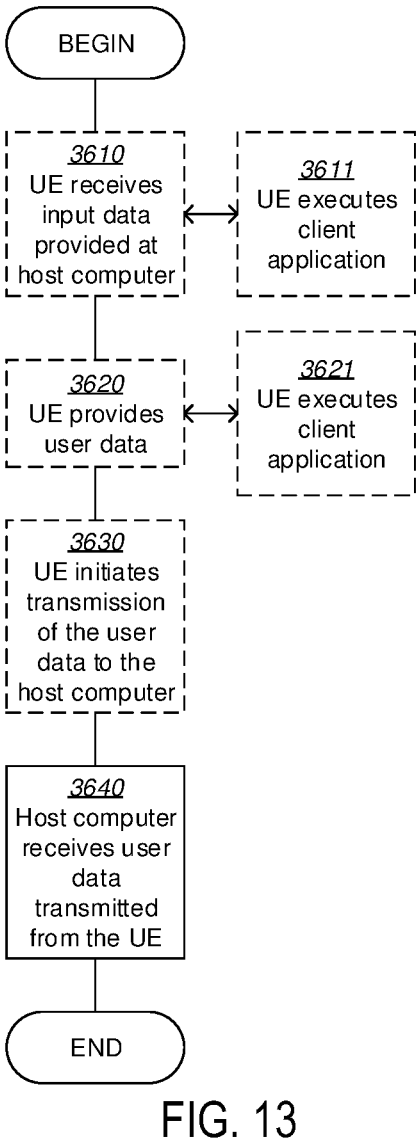
FIG. 13 is a flowchart illustrating a method implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 14:
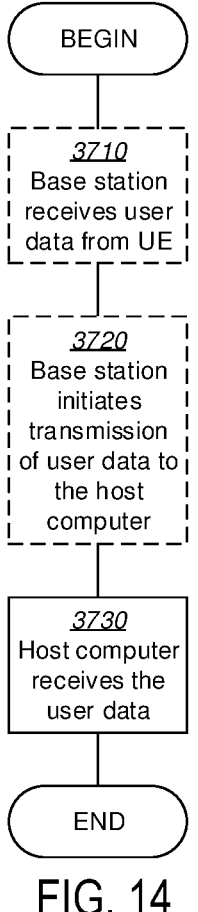
FIG. 14 is a flowchart illustrating a method implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method in a terminal device comprising:
transmitting a transport block (TB) to a network node with a first configured grant, having a first configuration associated with configured grants, wherein a configuredGrantTimer is used with the transmitting the TB to the network node; and
retransmitting autonomously the TB to the network node with a second configured grant having the first configuration associated with the configured grants, wherein the retransmitting autonomously the TB to the network node reuses the configuredGrantTimer, whose timer value equals a predetermined maximum time period, and wherein an expiration of the predetermined maximum time period causes the terminal device to stop retransmitting autonomously the TB to the network node.

2. The method according to claim 1 further comprising retransmitting autonomously the TB to the network node with a third configured grant having a second configuration associated with the configured grants.

3. The method according to claim 1 further comprising retransmitting autonomously the TB to the network node with a third configured grant having the first configuration associated with the configured grants.

4. The method according to claim 1, wherein the TB is transmitted with a hybrid automatic repeat request (HARQ) process.

5. The method according to claim 1, wherein the retransmitting autonomously of the TB is performed one or more times with a same hybrid automatic repeat request (HARQ) process.

6. The method according to claim 1, wherein the configuredGrantTimer is started at a time point related to the transmitting the TB.

7. The method according to claim 1, wherein the configuredGrantTimer is stopped when the terminal device receives an acknowledgement for reception of the TB.

8. The method according to claim 1, wherein the retransmitting autonomously the TB with the second configured grant is performed when the terminal device determines that an autonomous retransmission with the second configured grant is allowed.

9. The method according to claim 1, wherein the configuredGrantTimer is stopped when the terminal device receives a dynamic grant for retransmission of the TB.

10. The method according to claim 9, wherein the configuredGrantTimer is started when one of following events occurs:

a media access control (MAC) protocol data unit (PDU) corresponding to the TB has been generated;

a first listen before talk (LBT) operation is started for a first transmission attempt of the TB; and a first potential transmission opportunity for the TB occurs.

11. The method according to claim 1, further comprising:

indicating, to the network node, a number of transmission attempts for the TB or delay experienced for transmission of the TB.

12. The method according to claim 11, wherein the number of the transmission attempts or the delay experienced is indicated by one or more of:

redundant version of the TB;

uplink control information (UCI);

radio resource control (RRC) signaling;

MAC control element (CE); and

Layer 1 or Layer 2 signaling.

13. The method according to claim 11, further comprising:

receiving a signaling indicating termination of retransmissions for the TB.

14. A terminal device comprising:

at least one processor; and at least one memory, the at least one memory containing instructions which, when executed by the at least one processor, cause the terminal device to:

transmit a transport block (TB) to a network node with a first configured grant having a first configuration associated with configured grants, wherein a configuredGrantTimer is used with the transmit of the TB to the network node; and retransmit autonomously the TB to the network node with a second configured grant having the first configuration associated with the configured grants, wherein the retransmit autonomously the TB to the network node reuses the configuredGrantTimer, whose timer value equals a predetermined maximum time period, and wherein an expiration of the predetermined maximum time period causes the terminal device to stop retransmitting autonomously the TB to the network node.

15. A non-transitory computer-readable storage medium comprising instructions which, when executed by a processor, cause a terminal device to perform operations comprising:

transmitting a transport block (TB) to a network node with a first configured grant having a first configuration associated with configured grants, wherein a configuredGrantTimer is used with the transmitting the TB to the network node; and retransmitting autonomously the TB to the network node with a second configured grant having the first configuration associated with the configured grants, wherein the retransmitting autonomously the TB to the network node reuses the configuredGrantTimer, whose timer value equals a predetermined maximum time period, and wherein an expiration of the predetermined maximum time period causes the terminal device to stop retransmitting autonomously the TB to the network node.

\* \* \* \* \*